US006869628B2

(12) United States Patent
Krochta et al.

(10) Patent No.: US 6,869,628 B2
(45) Date of Patent: Mar. 22, 2005

(54) METHODS AND FORMULATIONS FOR PROVIDING GLOSS COATINGS TO FOODS AND FOR PROTECTING NUTS FROM RANCIDITY

(75) Inventors: John M. Krochta, Davis, CA (US); Soo-Yeun Lee, Davis, CA (US); Thomas A. Trezza, Dallas, TX (US); Kirsten L. Dangaran, Davis, CA (US)

(73) Assignee: The Regents of the University of California, Oakland, CA (US)

(*) Notice: Subject to any disclaimer, the term of this patent is extended or adjusted under 35 U.S.C. 154(b) by 39 days.

(21) Appl. No.: 09/879,796

(22) Filed: Jun. 11, 2001

(65) Prior Publication Data

US 2003/0082282 A1 May 1, 2003

(51) Int. Cl.⁷ .................................................. A23P 1/08
(52) U.S. Cl. ........................ 426/89; 426/93; 426/302; 426/309; 426/310; 426/656
(58) Field of Search .......................... 426/89, 93, 302, 426/309, 656, 310

(56) References Cited

U.S. PATENT DOCUMENTS

| | | | | | |
|---|---|---|---|---|---|
| 4,161,545 | A | * | 7/1979 | Green et al. | 426/93 |
| 4,217,369 | A | * | 8/1980 | Durst | 426/98 |
| 4,501,758 | A | * | 2/1985 | Morris | 426/93 |
| 4,515,820 | A | * | 5/1985 | Tang | 426/309 |
| 4,522,833 | A | * | 6/1985 | Sharma | 426/93 |
| 4,663,175 | A | * | 5/1987 | Werner et al. | 426/289 |
| 4,692,342 | A | * | 9/1987 | Gannis et al. | 426/293 |
| 4,738,865 | A | * | 4/1988 | Morris | 426/658 |
| 4,910,028 | A | * | 3/1990 | Bernacchi et al. | 426/93 |
| 4,935,251 | A | * | 6/1990 | Verhoef et al. | 426/94 |
| 5,061,499 | A | * | 10/1991 | Holloway, Jr. et al. | 426/93 |
| 5,102,680 | A | * | 4/1992 | Glass et al. | 426/572 |
| 5,104,674 | A | * | 4/1992 | Chen et al. | 426/573 |
| 5,128,159 | A | * | 7/1992 | Sayles | 426/310 |
| 5,401,518 | A | * | 3/1995 | Adams et al. | 426/89 |
| 5,529,800 | A | * | 6/1996 | Bourns et al. | 426/572 |
| 5,543,164 | A | * | 8/1996 | Krochta et al. | 426/302 |
| 5,853,778 | A | * | 12/1998 | Mayfield | 426/89 |
| 5,922,379 | A | * | 7/1999 | Wang | 426/138 |
| 5,939,119 | A | * | 8/1999 | Cheng et al. | 426/302 |
| 6,051,262 | A | * | 4/2000 | Krause et al. | 426/94 |
| 6,165,521 | A | * | 12/2000 | Mayfield | 426/90 |
| 6,528,088 | B1 | * | 3/2003 | Gilleland et al. | 424/451 |
| 6,649,188 | B2 | * | 11/2003 | Gilleland et al. | 424/479 |

FOREIGN PATENT DOCUMENTS

| EP | 0465801 | * | 1/1992 |
|---|---|---|---|
| WO | WO86/00501 | * | 1/1986 |

OTHER PUBLICATIONS

Trezza, T. A. et al.. 2000. The Gloss of Edible Caotaings as Affected by Surfactants, Lipids, Relative Humidity, and Time. J. of Food Science 65(4)658.*

Sothornvit, R. et al, 2000. J. of Food Science 65(4)700.*
Roy, S. et al., J. of Food Science 64(1)57.*
Trezza, T. A. , 2000. J. of Food Science 65(7)1166.*
Perez–Gago, M. S. 1999. J. of Food Science 64(4)696.*
Miller, K. S. , 1997. J. of Food Science 62(6)1189.*
Miller., K. S. 1998. J. of Food Science 63(2)244.*
Dangaran, K. L. et al.; "Whey protein isolate coatings as replacement for shellac in the confectionery industry"; IFT Annual Meeting & IFT Food Expo Jun. 23–27, 2001, New Orleans, LA; Abstract 86–9; Mar. 1, 2001 Available Website: http://ifl.confex.com/ift/2001/echprogram/paper_8346.htm Accessed on : Jan. 21, 2004.
Dangaran, K. L. and J. M. Krochta; "Effects of sucrose level on gloss and durability of whey protein isolate coatings for confectionary products"; IFT Annual Meeting & IFT Food Expo Jun. 15–19, 2002, Anaheim, CA; Abstract 72–6; Mar. 1, 2002 Available website: http://ift.confex.com/ift/2002/techprogram/paper_13618.htm Accessed on: Jan. 21, 2004.
Dangaran, K. L. and J. M. Krochta; "Sucrose crystallization in native and denatured whey protein isolate films"; IFT Annual Meeting & IFT Food Expo Jul. 12–16, 2003, Chicago, IL; Abstract 26–8; Mar. 1, 2003 Available website: http://ift.confex.com/ift/2003/techprogram/paper_20096.htm Accessed on: Jan. 21, 2004.
Krochta, John M.; "Film Edible"; The Wiley Encyclopedia of Packaging Technology, Second Edition, Brody, Aaron L. and Kenneth S. Marsh, eds.: 1997; pp. 397–401; John Wiley & Sons, Inc.
Krochta, John M.; "Whey protein interactions: effects on edible film properties"; ACS Symposium Series: Functional Properties of Proteins and Lipids, Whitaker, John R., et al., ads.: 1998; pp. 158–167; American Chemical Society; Washington D.C.
Lee, S.–Y and J. M. Krochta; "Modeling shelf–life of whey–protein–coated peanuts analyzed by static–headspace gas–chromatography"; IFT Annual Meeting & IFT Food Expo, Jun. 23–27, 2001, New Orleans, LA; Abstract 73D–30; Mar. 1, 2001; Available Website: http://ift.confex.com/ift/2001/techprogram/paper_9044.htm Accessed on: Jan. 21, 2004.

(List continued on next page.)

Primary Examiner—Carolyn Paden
(74) Attorney, Agent, or Firm—Townsend and Townsend and Crew LLP

(57) ABSTRACT

The invention provides compositions and methods for providing edible gloss coatings for foods on which a gloss coating is desirable. The invention is particularly useful for providing gloss coatings to confections, such as chocolates, hard panned confections, soft panned confections, yogurt coated confections, starch molded confections, and compressed sugar tablets. The invention further provides methods for delaying the development of rancidity in nuts by mildly abrading the nut while contacting it with an edible film forming agent.

43 Claims, No Drawings

OTHER PUBLICATIONS

Lee, S.-Y et al.; "Consumer acceptance of whey–protein–coated versus shellac–coated chocolates"; *IFT Annual Meeting & IFT Food Expo, Jun. 23–27, 2001, New Orleans, LA*; Abstract 98–11; Mar. 1, 2001; Available Website: http://ift.confex.com/ift/2001/techprogram/paper_8758.htm Accessed on: Jan. 21, 2004.

Maté, Juan I. and John M. Krochta; "Whey protein coating effect on the oxygen uptake of dry roasted peanuts"; *J. Food Sci.*; 1996; pp. 1202–1208; vol. 61, No. 6; Institute of Food Technologies.

Maté, Juan I. and John M. Krochta; "Whey protein acetyland monoglyceride edible coatings: effect on the rancidity process of walnuts," *J. Agric. Food Chem,*; 1997; pp. 2509–2513; vol. 45; American Chemical Society.

Maté, Juan I. et al.; "Whey protein isolate edible coatings: effect on the rancidity process of dry roasted peanuts"; *J. Agric. Food Chem,*; 1996; pp. 1736–1740; vol. 44; American Chemical Society.

McHugh, Tara Habig and John M. Krochta; "Milk–protein–based edible films and coatings"; *Food Technology*; Jan. 1994, pp. 97–103.

McHugh, Tara Habig and John M. Krochta; "Sorbitol–vs. glycerol–plasticized whey protein edible films: integrated oxygen permeability and tensile property evaluation"; *Journal of Agriculture and Food Chemistry*; 1994; pp. 841–845; vol. 2; American Chemical Society.

McKibben, Jason B. and J. M. Krochta; "Properties of whey protein concentrate films of varying protein contents compared to whey protein isolate films"; *IFT Annual Meeting & IFT Food Expo. Jun. 10–14, 2000, Dallas, TX*; Abstract 78C–16; Mar. 1, 2000;

McKibben, Jason B. and J. M. Krochta; "Properties of whey protein concentrate films of varying protein contents compared to whey protein isolate films"; *IFT Annual Meeting & IFT Food Expo, Jun. 10–14, 2000, Dallas, TX*; Poster presentation, Tuesday, Jun. 13, 2000.

Pérez–Gago, M. B. et al.; "Water vapor permeability, solubility, and tensile properties of heat–denatured versus native whey protein films"; *Journal of Food Science*; 1999; pp. 1034–1037; vol. 64, No. 6; Institute of Food Technologists.

Trezza, T. A. and J. M. Krochta; "Specular reflection, gloss, roughness and surface heterogeneity of biopolymer coatings", *Journal of applied Polymer Science*; 2001; pp. 2221–2229; vol. 79; John Wile & Sons, Inc.

\* cited by examiner

METHODS AND FORMULATIONS FOR PROVIDING GLOSS COATINGS TO FOODS AND FOR PROTECTING NUTS FROM RANCIDITY

CROSS-REFERENCES TO RELATED APPLICATIONS

This application is related to a co-owned application, Ser. No. is 09/879,794 filed Jun. 11, 2001.

STATEMENT AS TO RIGHTS TO INVENTIONS MADE UNDER FEDERALLY SPONSORED RESEARCH AND DEVELOPMENT

Not applicable.

BACKGROUND OF THE INVENTION

Glazing is usually done as the final step in making high quality confectioneries, to provide a brilliant surface and a moisture-barrier coating. Glazing is generally achieved using edible wax and/or shellac (Bertram, H. T., *The Manufacturing Confectioner*, 68(10):65–69 (1988). Shellac coating, in addition to giving a brilliant finish, provides very good protection against high humidity (Minifie, B. W., *Chocolate, Cocoa & Confectionery: Science & Technology*, 2nd Ed., AVI Publishing Company, Inc., Westport, Conn., pp. 105–127 (1980a). Shellac is a resinous secretion of the lac beetle and is refined to be used for the preparation of varnishes and polishes (Minifie, B. W., *Science & Technology*, 2nd Ed., AVI Publishing Company, Inc., Westport, Conn., p 252–273 (1980b). Prior to the glazing step, a gum solution is applied to seal the pores and cracks of the chocolate surface (Bertram, H. T., *The Manufacturing Confectioner*, 68(10):65–69 (1988); Strub, R., *The Manufacturing Confectioner*, 51–54 (1987). The main reason for the gum coating is to provide a barrier to the possible absorption of ethanol from the shellac coating solution into the chocolate. Ethanol, which is miscible with the fats and oils contained in chocolate, may cause bitter and off-flavors which are not desirable (Isganitis, D. K., *The Manufacturing Confectioner*, 68(10):75–78 (1988).

Using ethanol as solvent can also produce volatile organic compounds which are hazardous to the environment. Ethanol-based shellac also possesses a potential explosion hazard during processing (Minifie, B. W., *Chocolate, Cocoa & Confectionery: Science & Technology*, 2nd Ed., AVI Publishing Company, Inc., Westport, Conn., pp. 105–127 (1980a). A water-based glaze formulation would not only be able to eliminate one processing step (gum coating step), but it would also eliminate the potential explosion and environmental hazards. Additionally, many consumers would find elimination of an insect-based coating to be more palatable than an insect-based coating.

Whey proteins with plasticizer form transparent and flexible films when cast and dried from aqueous solution. A whey protein film using glycerol as a plasticizer was shown to provide high gloss, comparable to shellac, dextrin and corn zein and better than HPMC coatings, when coated on matte black acrylic plastic (Trezza, et al., *J. Food Sci.*, 65(4): 658–662 (2000) (hereafter, "Trezza 2000")). Unfortunately, when applied to chocolate rather than plastic, the whey protein-based film described in Trezza 2000 had a lower initial gloss value than it had had on plastic, and a rapid rate of gloss fade that resulted in the loss of gloss within a few days. It would be useful to have gloss coatings for confections and other foods that provide a higher gloss value and a gloss stable enough for use in normal commercial applications.

Another aspect of food acceptance by consumers is the freshness of peanuts and other nuts (although peanuts are technically legumes, they are considered as nuts in the mind of the public and are, for example, the predominant component of most so-called "mixed nut" products). Peanuts and other nuts are high in oil and fat content. In peanuts, for example, these oils and fats mainly consist of unsaturated fatty acid providing high vulnerability to oxidative rancidity (Conkerton and St. Angelo, Peanuts (Groundnuts), In: Wolff Iowa, editors, *CRC Handbook of Processing and Utilization in Agriculture*, Vol. 2, Part 2, Plant Products. Boca Raton, Fla. CRC Press, p 157-(1983); Yuki et al., *J. Jpn. Soc. Food Sci. Technol.*, 25:293–301 (1978); Ahmed and Young, Composition, quality, and flavor of peanuts. In: *Peanut Science and Technology*, Amer. Peanut Res. & Educ. Assoc., Yoakum, Tex., p. 655–688). For roasted peanuts, autoxidation is the major cause of oxidative rancidity (Divino et al., *J. Food Sci.*, 61(1):112–115, 120 (1996)). Autoxidation in peanuts results in 'flavor-fade' and off-flavor development, due to the masking of pyrazines by large amounts of low-molecular weight aldehydes such as hexanal (Warner et al., *J. Food Sci.*, 61(2):469–472 (1996); Dimick, PS, Peanut flavor-fade research report, The manufacturing confectioner, Jan.: 45–48 (1994)). Hexanal, which is a major breakdown product of the linoleic acid oxidation (Frankel E N, *Prog. Lipid Res.*, 22:1–33 (1982)), has been shown to be a good indicator of oxidative rancidity in peanuts (Mate et al., *J. Agric. Food Chem.*, 44:1736–1740 (1996).

Whey-protein-isolate (WPI)-based films using heat denatured WPI have been found to be oxygen barriers (Mate and Krochta, *J. Agric. Food Chem.*, 44(10):3001–3004 (1996a)). Whey protein coatings applied by a bench-scale coating method have been shown to provide some protection against oxidative rancidity in peanuts when analyzed by chemical and instrumental methods (Maté and Krochta, *J. Food Sci.*, 61(6):1202–1206, 1210 (1996b); Mate et al., *J. Agric. Food Chem.*, 44:1736–1740 (1996)). Application of whey protein films to peanuts, however, required viscous films, and achieving that viscosity required the whey protein mixture to sit for several days. It would be desirable to find improved methods for creating whey protein films that did not require materials to be prepared for days in advance of use.

BRIEF SUMMARY OF THE INVENTION

The invention provides new methods and formulations for providing gloss coatings to foods that do not have a peel or a skin. The gloss coatings of the invention comprise whey protein isolate (WPI) or soy protein isolate (SPI) and a disaccharide or monosaccharide plasticizer. In one group of embodiments, the coating comprises WPI. The WPI or SPI can be denatured or native (undenatured), or can comprise both denatured and undenatured WPI or SPI, or both. The plasticizer is preferably a disaccharide. The plasticizer is selected from the group consisting of: sucrose, maltose, trehalose, cellubiose, and lactose. In preferred embodiments, the disaccharide is lactose and in even more preferred embodiments, it is sucrose.

In one group of embodiments, the food is a confection. The confection can be a hard panned confection, a soft panned confection, a starch molded confection, a compressed sugar tablet, a confection covered with a dried yogurt mixture, or a chocolate. The chocolate can be selected from the group consisting of: milk chocolate, semi-sweet chocolate, bitter-sweet chocolate, sweet chocolate, dark chocolate, and imitation chocolate.

The gloss coating can further comprise a lipid. In preferred forms, the lipid is cocoabutter.

The invention further comprises methods of providing an edible gloss coating to a food, said method comprising coating said food with (a) a film-forming protein selected from the group consisting of whey protein isolate (WPI) and soy protein isolate (SPI) and (b) a disaccharide or monosaccharide plasticizer. In preferred forms, the film-forming protein is WPI. The WPI or SPI can be native, denatured or a combination of native and denatured.

The disaccharide or monosaccharide plasticizer is preferably a disaccharide. The disaccharide can be is selected from the group consisting of: sucrose, maltose, trehalose, cellobiose, and lactose. In preferred embodiments, the plasticizer is sucrose.

In preferred embodiments, the food is a confection. The confection can be a hard panned confection, a soft panned confection, a starch molded confection, a compressed sugar tablet, a confection covered with a dried yogurt mixture, or a chocolate. The chocolate can be selected from the group consisting of: milk chocolate, semi-sweet chocolate, bittersweet chocolate, sweet chocolate, dark chocolate, and imitation chocolate.

In another group of embodiments, the invention provides methods for increasing shelf life of a nut, said methods comprising (a) contacting said nut with an aqueous solution comprising whey protein isolate (WPI) or soy protein isolate (SPI), (b) mildly abrading said nut, and (b) drying said nut to its original water content, thereby increasing its shelf life. The WPI or SPI can be native (undenatured) or denatured, or a combination of both native and denatured, and combinations of SPI and WPI (either native or denatured, or both) can be used.

The solution can further comprise a surfactant. The surfactant can be, for example, lecithin, or a Tween®, or Span™. In preferred embodiments, the Tween® is Tween® 85 and the Span™ is Span™ 20.

The mild abrasion can be caused by contacting said nut with a surface. The surface can be a second nut. The method can include moving the nut against the second nut by placing said nut and said second nut in a movable container and moving, vibrating, rotating or shaking said container, thereby moving said nut against said second nut. The nut can also be moved against said second nut by placing said nut and said second nut on a surface and agitating the nuts, for example, by stirring them. The nut and the second nut can be of different types, for example the nut can be a peanut and the second nut a pecan. The nut can be a peanut, an almond, a cashew, a walnut, a hazelnut, a pecan, a macadamia, a pistachio, a Brazil nut, or a filbert.

DETAILED DESCRIPTION OF THE INVENTION

The invention provides new methods of providing gloss to foods, such as chocolates and other confections, and to protecting peanuts from rancidity.

A. Gloss Coatings for Foods

In one set of embodiments, the invention provides stable, water-based gloss coatings for foods, such as chocolates and other confections, on which gloss coatings are desirable. As discussed in the Background section, current formulations for providing gloss coatings or glazings to chocolates and other confections typically require the use of volatile organic solvents (VOS). As discussed above, in Trezza 2000, a possible alternative involving a water-based formulation. The results on standard plastic casting plates used to measure gloss indicated that an edible film using whey protein and glycerol as a plasticizer would give a gloss comparable to that of shellac. Unfortunately, when actually tested on chocolate, glycerol-plasticized coating proved to have a relatively low gloss value and a rapid rate of gloss fade. Within days of coating, the gloss faded away, and the coating had a low residual gloss value. Thus, the results on plastic plates were not predictive of results on chocolate.

Surprisingly, it has now been discovered that stable edible film coatings can be made from a whey protein isolate (WPI) using sucrose or other disaccharides, such as maltose or lactose, as a plasticizer. The use of sucrose as a plasticizer is known in the art. It was also known, however, that plasticizers that are solid at room temperature, such as sucrose, tend to crystallize. Films using solid plasticizers therefore tend to become marred by crystal formation, resulting in an undesirable lumpy, milky appearance rather than an even gloss. The art has therefore generally avoided solid plasticizers in favor of liquid plasticizers, with glycerol being the plasticizer most commonly used.

Surprisingly, it has now been determined that, for use on foods, and especially on confections, WPI-based films with sucrose or other disaccharide plasticizers have surprising advantages for use on foods that do not have a peel or other barrier to migration of components of the film. Such films provide a gloss that has a high initial gloss value. Moreover, the gloss of such films stabilizes at a high gloss value and retains that gloss value over a period of one month, two months, or even longer. Sucrose and other disaccharides are therefore surprisingly superior plasticizers for edible films for use on confections.

Without wishing to be bound by theory, it is believed that the mass size of the molecules is a factor and that disaccharide molecules are sufficiently bulky that their movement into the confection is slowed compared to the linear molecules of glycerol, polyethylene glycol, and other commonly used plasticizers. In addition to sucrose, other disaccharides can be used, such as trehalose and cellobiose. Semi-sweet, sweet, and milk chocolate all contain milk solids and therefore contain at least some lactose. Thus, the concentration gradient of lactose in these chocolates is reduced and will tend to migrate less from coatings of those chocolates, reducing the opportunity for the gloss to fade. Since chocolates and other confections are commonly made with substantial amounts of sucrose, the sucrose in a sucrose-plasticized film also does not face a concentration gradient and thus will have a limited tendency to migrate into the confection. Thus, while any disaccharide can be used to make a satisfactory edible film to coat a food, such as a chocolate or a confection, lactose is preferred and sucrose is the most preferred.

In view of the results with disaccharides, it is expected that gloss coatings can also be made with monosacchrides, such as sorbitol. Monosaccharides are, however, less bulky than disaccharides, so they may be more prone to migration from the film. Accordingly, disaccharides are more preferred.

In view of the results achieved with WPI, it is expected that soy protein isolate (SPI) can also be used to form gloss coatings for foods, such as chocolates.

The coating or film can be made even smoother and less marked if a lipid approved for food use is added to the mixture prior to application to the chocolate or other condiment. Preferably, the lipid is one solid at room temperature. Milk fat or milk fat fractions are preferred lipids for use. Cocoa butter is more preferred and is especially preferred for use in coatings for chocolates since it is already in the chocolate (except, of course, in imitation chocolates). It will therefore have a reduced concentration gradient and consequently a reduced possibility of migration out of the film into the chocolate.

Methods of making water-insoluble films and coatings from water based WPI solutions are known. See, Krochta, U.S. Pat. No. 5,543,164. These methods use denaturing of the proteins with heat, chemicals and/or enzymes to induce thiol-disulfide interchange and thiol oxidation reactions, thereby forming new intermolecular and intramolecular disulfide crosslinkages. Coatings made with denatured proteins can be used in the compositions and methods of the present invention to protect the condiment from moisture. Mixtures of various proportions of denatured and non-denatured proteins can be used to impart any desired level of protection from moisture. For example, if moisture protection is not important for the product of interest, native (undenatured) WPI can be used and the step of denaturing the WPI avoided, if it is important, the WPI can be denatured to add a level of protection to the condiment.

Solutions containing native (undenatured) WPI or composed only of native WPI are also advantageous because higher amounts of solids can be introduced into the mixture, reducing the amount of water that has to be evaporated to leave the film coating the food article. Denatured WPI cannot be dissolved into water at concentrations above about 12% by weight. By contrast, native WPI can be dissolved at levels up to about 40% by weight. And, these concentrations are additive, so that solutions of about s12% by weight and 40% by weight of native WPI can be made. Since higher concentrations reduce the amount of water to be evaporated, the time to form the films or coatings on food articles can be reduced.

The invention is particularly useful with respect to foods that do not have a peel or skin that would impede migration of the plasticizer into the food and that do not have to be heated or cooked after the contacting with the film or coating. Thus, the invention is useful with regard to food items other than unpeeled (or unskinned) fruits on which a gloss might be attractive to a consumer.

In a preferred group of embodiments, the food is a confection. In preferred forms, the coatings and methods of the invention can be used to provide gloss coatings for yogurt-coated confections such as raisins and pretzels. Similarly, the coatings and methods of the invention can be used on starch molded confections, such as gummy products (such as "gummy bears") and on soft panned confections, such as jelly beans and related products. The invention can also be used on hard panned confections, that have a hard sugar coating, such as "jaw breakers" and M&Ms®, and mints, as well as on compressed sugar tablets. In general, the coatings of the invention are suitable for use with any confection so long as it does not have to be baked or cooked after application of the edible film or coating.

In a particularly preferred group of embodiments, the confections comprise chocolate as the exterior surface of the confection. Thus, the coatings can be used not only for chocolate bars and chocolate sold by the piece (including confections having a filling surrounded by chocolate), but also for the familiar candy bar, in which a wafer, caramel, peanut mix, or other sweet is covered with chocolate.

In preferred embodiments, the food or confection uses sucrose as a sweetening agent. The coatings and methods of the invention can be used with artificially sweetened condiments, but in such confections there is a greater concentration gradient between the coating and the confection or other food itself and the gloss may therefore stabilize at a lower level than is true with sugar-sweetened foods or confections. Whether the coating stabilizes at a level that is satisfactory for any particular food or confection can be readily determined using the assays for measuring gloss and for measuring consumer acceptance set forth in the Examples.

B. Coatings for Delaying Rancidity in Nuts

In another set of embodiments, the invention provides new ways of delaying the development of rancidity in nuts.

In earlier work, WPI films were used to delay rancidity in nuts. One problem in applying these aqueous-based films to nuts and peanuts resulted from the high oil content typically found in nuts. Water tends to "bead" on nuts. Attempts to coat the nuts with WPI films by dipping them in a solution containing a surfactant proved insufficient to coat the nuts. To overcome the hydrophobicity of the nuts, the WPI compositions were "aged" for several days under refrigeration to increase their viscosity, thereby increasing their ability to adhere to the nut long enough to coat it.

The present invention relates to the discovery that the several days needed to age of the WPI solution can be eliminated by mildly abrading the nuts. Surprisingly, the addition of mild abrasion, such as mechanical agitation, removed the need to "age" the formulations to increase viscosity.

In preferred embodiments, a food grade surfactant is added to aid in adhesion of the film-forming agent. A surfactant can improve the adhesion by making up for polymer immobility at the surface. A polymer can make a more stable interface than a surfactant; however, the surfactant can get to the surface more quickly and establish an interface. Ethoxylates such as TWEEN® and sorbitan esters such as Span™ can be used. Lecithin, TWEEN ® 85, and Span™ 20 are food grade surfactants that have been tested and work in the methods of the invention. The compositions may further comprise a plasticizer. Glycerol is a preferred plasticizer in these methods, however, other plasticizers, such as polyethylene glycol, can be used.

Desirably, the abrasion is not so great as to damage the nut or to reduce the attractiveness of its appearance. Conveniently, the abrasion can be provided by rolling the nut in a container (for example, by rotating or by vibrating the container) or by contacting the nut with other nuts, either of the same type or of other types, and then causing them to move relative to one another. This can be caused by any convenient means, such as by placing the nut or nuts in a container and then jostling, shaking, vibrating or rotating the container.

Alternatively, the nuts can be placed in a container with the formulations and mechanical action or agitation added to move the nuts in the container and bring them into contact with one another. For example, the nuts can be stirred with a stirring rod or a mechanical agitator. In a preferred embodiment, the nuts and the formulation are placed in a confectionery "pan" (a stainless steel drum which resembles a cement mixer) and the drum of the pan rotated. Nuts with a round or oval configuration are easily contacted with the solution in this way for 20 seconds up to several minutes. Nuts with shapes which make it harder to contact the entire surface easily (such as cashew, which have an interior curve which is a little less accessible, or nuts with grooves or other indentations which are harder to reach, such as walnuts) should be subjected to the agitation for a longer period, preferably from a minute to several minutes, to facilitate more even contacting with the solution. It is anticipated that the contacting will still retard overall degradation of the nut even if less than 100% of the surface is subjected to abrasion.

Once the nut has been contacted with the formulation, it is desirably dried to its original water content. The particular method of drying the nuts is not critical. For example, the nuts can be air dried, room air can be blown on them, heated air can be blown on them, or the nuts can be passaged through a tunnel drier, and the time can be as much as necessary to return to their original water content.

Regarding determining the development of rancidity, it can be noted that, following exposure to air, nuts undergo a so-called induction period. The end of the induction period is denoted by a marked increase in production of oxidation products of oils present in the nut. This period until the end of the induction period can conveniently be considered as the shelf life of the nut. While shelf life can be determined by any convenient means, food scientists often use a particular degradation product, hexanal, as a marker for oxidation of nut oils. Hexanal, which is a major breakdown product of the linoleic acid oxidation (Frankel E N, *Prog. Lipid Res.*, 22:1–33 (1982)), has been shown to be a good indicator of oxidative rancidity in peanuts (Mate et al., *J. Agric. Food Chem.*, 44:1736–1740 (1996)). Volatiles such as hexanal can be detected by various assay formats known in the art. In a preferred embodiment, the assay format is static headspace gas chromatography. Samples of the nut under study are taken at various points in time and ground to a powder to provide increased surface area and thereby release any volatile degradation products. Volatile degradation products for other nuts are known in the art. If the nut of interest is one other than peanut, the assay can be used to detect the presence of a volatile degradation product known to be produced by the nut of interest.

The invention is particularly useful with regard to peanuts. Although scientifically the peanut is classified as a legume, in the mind of the public, it is considered a nut. Indeed, commercially sold containers of "mixed nuts" typically contain peanuts as the predominant "nut" present. Studies on peanuts have shown that contacting a peanut with water and then drying it results in a marked extension of shelf life. Without wishing to be bound by theory, it is believed that the surface of the peanut has pores that permit air access below the surface of the peanut and that the presence of water causes the surface around the pores to expand, collapsing the pores, thereby rendering the surface of the nut less permeable to air. References below to nuts include peanuts unless otherwise specified. The invention is applicable to all types of nuts, such as pecans, almonds, cashews, walnuts, Brazil nuts, macadamia nuts, hazel nuts, and filberts.

Definitions

Unless otherwise defined, terms used herein have their ordinary meaning as used in the art.

As used herein, the terms "plasticizer" and "food grade plasticizer" refer to compounds which increase the flexibility of films and which have been approved for use in foods. Preferred plasticizers are disaccharides, with sucrose being the most preferred. Polyalcohols such as glycerol, sorbitol and polyethylene glycol are not preferred in the compositions and methods of the invention.

As used herein, "food grade" means approved for human consumption by any necessary authorities. Unless otherwise specified, all plasticizers, surfactants, lipids, whey protein isolate (WPI), soy protein isolate (SPI) and other components of the films and coatings discussed herein are assumed to be of food grade.

As used herein, the term "film" refers to a stand-alone thin layer of material which is flexible and which can be used as a wrapping. Films of the present invention are formed either with a protein or a protein in combination with a plasticizer and may further comprise a lipid. Additionally, films may be formed from emulsified mixtures containing proteins and lipids.

As used herein, the term "coating" refers to a thin film, which surrounds the coated object. Coatings will not typically have the mechanical strength to exist as stand-alone films and are formed by applying a diluted component mixture to an object and evaporating excess solvent.

As used herein, "chocolate" refers to a confection in which one or more surfaces are formed of exposed chocolate on which a gloss coat would be desirable, in contrast to candies such as "M&Ms," in which the chocolate is fully concealed by a hard candy shell. Preferably, the chocolate is one intended for eating as a confection, in distinction to "baking" or "bitter" chocolate, which is generally intended for baking. Thus, milk chocolate, sweet chocolate, dark chocolate, and semi-sweet or bitter-sweet chocolate are all encompassed in the chocolates, which can be used in the invention. Compositions of the various kinds of chocolates are known in the art, and set forth in standard works, such as H. W. Ockerman, Source Book for Food Scientists (Avi Publishing, Westport, Conn. 1978). The term also refers to so-called "imitation chocolate" in which the cocoa fat in the chocolate liquor is replaced with another vegetable fat. Such imitation chocolates are used for coating ice cream bars, crackers or candies and the substitution of the cocoa butter can improve resistance to melting or other properties. See, e.g., Potter and Hotchkiss, Food Science, $5^{th}$ Ed. 1995 (Chapman and Hall, N.Y.).

As used herein, the term "lipid" refers to food grade oils, waxes, fatty acids, fatty alcohols, monoglycerides and triglycerides having long carbon chains of from 10 to 20 or more carbon atoms, which are either saturated or unsaturated. Cocoabutter is a preferred lipid.

As used herein, the phrase "drying to its original water content" means to restore the article or item in question to within ±10% of its original water content. More preferably, it means to restore the article or item in question to ±5% of its original water content.

EXAMPLES

Example 1

Dozens of film formulations were explored in the course of arriving at the present invention. This Example and Example 2 set forth exemplary studies of differences in gloss and gloss stability of four of the formulations tested.

Materials and Methods for Gloss Stability Studies:

The whey-protein-based coatings included WPI (Bipro®, Davisco Foods International, Lesuer, Minn., USA) as a film-forming agent. Plasticizers included: sucrose (granulated pure cane sugar, C & H Inc., Crockett, Calif., USA), glycerol (USP/FCC, Fisher Scientific Inc., Fair Lawn, N.J., USA), propylene glycol ("PG," USP/FCC, Fisher Scientific Inc., Fair Lawn, N.J., USA) and poly ethylene glycol 400 ("PG-400," NF, Fisher Scientific Inc., Fair Lawn, N.J., USA). Cocoabutter (Blommer Chocolate, Union City, Calif., USA) was added to some WPI/plasticizer formulations to aid the coating process, by increasing coating solids content and reducing coating tack marks.

Heat-denatured 10% WPI solution was used as the base solution. The denatured solution was prepared by heating 10% native WPI solution (w/w) for 30 min in a water bath at 90° C. (McHugh and Krochta, J. American Oil Chemist Society, 71(3): 307–312 (1994)). The heat-denatured solution was then cooled down to room temperature using an ice bath, and each plasticizer was added at a 1:1 ratio of WPI to plasticizer. For those formulations including cocoabutter, melted cocoabutter was added to the heat denatured WPI solution in the amount of 2 parts cocoabutter to 3 parts denatured WPI. This formulation then was emulsified for 5 minutes using a hand blender (Braun hand blender MR360, Braun Inc., Woburn, Mass., USA). After the emulsion was cooled down to room temperature with an ice bath, native WPI was added at a level of 1 part denatured WPI to 1 part native WPI. Each plasticizer was added to the emulsion in the amount of 1 to 1 ratio of the total WPI to plasticizer. The total solids content of the final formulation was 33.42%. Two batch replications of each WPI/plasticizer formulation were made to investigate the effect of formulation batch replications on gloss of the chocolate samples. This formulation batch replication is denoted as formulation replication throughout this paper.

Coating Casting and Drying onto Matte Black Acrylic Plates

WPI/plasticizer formulations with and without cocoabutter were cast on 4 in×4 in×⅛ in thick sheets of matte black acrylic plastic plates (Tap Plastics, Sacramento, Calif., U.S.A.), using a Bird-type applicator (Paul Gardner Co., Pompano Beach, Fla., U.S.A.). Coatings were dried at ambient conditions (22–25° C., 33–45% RH) for 24 h. The resulting dry coating thickness was aimed at 42.4 $\mu$m.

Coating Procedure and Batch Preparation for Chocolate Samples

For the four formulations containing cocoabutter and differing in plasticizer types, the coating was done with a pan coater (LP16, LMC International, Elmhurst, Ill., USA) with a diameter of 16 inches. This coater is a conventional coater used in the confectionery industry. The coating formulation was ladled onto the unglazed milk chocolate covered almonds (10832801, Shade foods Inc., Union City, Calif.) and evenly distributed by rotating the pan at 72 rpm. The rotation was stopped once the solution was completely applied (about 30 seconds), then the drying process was started. The batches were dried in the pan using cool air (10–20° C.).

The drying process consisted of drying one side of the batch, then 180° rotation of the pan to flip the sample batch to the other side, then drying that side. The drying cycle was about 10–20 min each side, with about 4–6 flips. Hence, the total drying time was in the range of 1.5 to 2 h. Two coatings were applied for each treatment. After each coating application, the process batch was laid out in a room with a temperature range of 15–20° C. for 24 h. Two process batch replications were made for each formulation replication. This process batch replication is denoted as the process replication throughout this paper.

Since the $a_w$ values of the commercial chocolates were in the range of 0.35 to 0.4, we attempted to adjust the $a_w$ of the coated chocolate samples in this study back to within the same range. Thus, after the second coating was applied and the coating was completely dried for ~24 h, the batches were conditioned in constant relative humidity (RH) chambers (Fisher Scientific, Fairlawn, N.J., USA) at RH of 20% to decrease their $a_w$ from 0.5 to 0.35. RH of the chamber was achieved using saturated salt solution of magnesium chloride (Certified A.C.S., Fisher Scientific Inc., Fair Lawn, N.J., USA) and moisture absorbent sachets (silica gel pillow pack, Desiccare Inc., Santa Fe Springs, Calif., USA). Thus, the RH of the chamber was ~20%, and the $a_w$ of the chocolate samples equilibrated around 0.35 within 3 to 4 d. Once the $a_w$ of the samples reached 0.35, they were stored in 473 ml mason jars in ambient conditions, and the gloss was measured periodically until it stabilized. The chocolate samples were stored in three different mason jars for each process replication. This was regarded as the storage replication.

Instrumental Gloss Measurement Procedure (i) MICRO-TRI-GLOSS Measurement

The gloss of the coatings on acrylic plastic plates was measured using a MICRO-TRI-GLOSS meter (BYK Gardner, Silver Spring, Md., U.S.A.). Specular gloss, otherwise known as the perception of "shininess," is defined as the intensity of light that is specularly reflected from a sample surface compared to the intensity of light that is specularly reflected from a known standard surface at a given angle of incidence (Standard test method for specular gloss. Designation D523. 1995 Annual Book of ASTM Standards. Volume 6.01: Paint-tests for chemical, physical and optical properties; appearance; durability of non-metallic materials. Philadelphia, Pa.: American Society for Testing and Materials, 1995 (hereafter, "ASTM 1995")). Gloss of the coatings was measured at three different angles of incidence, 20°, 60° and 85° from the normal to the coating surface (ASTM 1995). Polished black glass with a refractive index of 1.567 was used as the standard surface (ASTM 1995). A gloss value of greater than 70 when measured at 60° angle of incidence is considered to be high gloss, and a gloss value of smaller than 10 at 600 angle of incidence is considered to be low gloss. An 85° angle of incidence can aid in differentiating low gloss samples, whereas 20° can aid in differentiating high gloss samples. The matte black acrylic casting plates had gloss values of 0.2, 1.7 and 6.1 when measured at the angle of incidence of 20°, 60° and 85°, respectively. These low gloss values indicated that there was no double reflection effect to interfere with the gloss measurements of the coatings.

Tricor Gloss Meter Measurement

The gloss of coatings on acrylic plastic plates and the gloss of the chocolate samples were measured using a Tricor gloss meter (801A, Tricor Systems Inc., Elgin, Ill., USA). The Tricor gloss meter allows measuring of gloss of samples with curved surfaces. Before the gloss of the sample is measured, the instrument is calibrated using a calibration reference plate with gloss value of 274. The gloss of the reference plate when measured using the MICRO-TRI-GLOSS meter was 91.9, 94.8 and 99.9 at 20°, 60° and 85° angles from the normal to the plate surface. For the gloss measurement of the sample, gloss data is extracted from a grey scale image of the sample generated by the instrument. The grey scale image consists of many pixels, and brighter pixels indicate more gloss at that location. In order to quantify gloss of a curved surface, pixels with similar brightness are grouped together, and the average gloss of those pixels is calculated. A group can be specified by the experimenter, and is usually represented as the x % of the brightest pixels above a threshold designated by the experimenter. The threshold value should be set high enough so that the gloss of the sample is the only gloss values taken for the average gloss. In this study, the average gloss of the 5% of the brightest pixels was recorded for each sample, and the threshold value was designated as 45. Each chocolate sample was measured three times for each storage replication, and this was regarded as the instrumental replication.

Statistical Analysis

Correlation analysis was conducted with Excel® software (Microsoft office 98 Version 8.0 for Apple® Macintosh® Series, Microsoft Corp.) for the two gloss data sets measured by the MICRO-TRI-GLOSS meter and the Tricor gloss meter. Analysis of variance (ANOVA) and Fisher's least significant differences (LSD) ($p<0.05$) were executed with the SAS software (SAS version 6.12, 1996) on the gloss values for the chocolate samples measured by the Tricor gloss meter.

Example 2

Results and Discussion

Correlation for the Two Gloss Data Sets Measured by the MICRO-TRI-GLOSS Meter and the Tricor Gloss Meter The gloss data sets for WPI coatings with and without cocoabutter on acrylic plastic plates measured by the Tricor gloss meter averaged for 15% brightest pixels were compared to those measured by the MICRO-TRI-GLOSS meter at 20°, 60° and 85° angle of incidence, respectively. The correlation coefficients (r) at different angles of incidence were all significant at $p<0.001$, indicating that the Tricor gloss meter generates gloss data in correlation to that of the MICRO-TRI-GLOSS, which is a standard gloss measurement (ASTM 1995). The correlation coefficient and the determination of correlation ($r^2$) increased with increasing angle of incident light source of the MICRO-TRI-GLOSS, which indicated that the Tricor gloss meter is more efficient in differentiating low gloss samples. This finding was also shown by the trend of the data sets. The Tricor gloss meter was able to differentiate samples with similar gloss values from the MICRO-TRI-GLOSS meter for low gloss samples, whereas the MICRO-TRI-GLOSS was more efficient in distinguishing samples of similar values for high gloss samples. The significant r and the high $r^2$ values gave validity for using the Tricor gloss meter to measure gloss of the curved chocolate surface.

Gloss Values for Chocolate Samples Glazed with 4 Different WPI/Plasticizer Formulations The variance of results on the gloss values of the 15% brightest pixels for the four WPI/plasticizer coated chocolate samples, as measured by the Tricor gloss meter, was analyzed. The plasticizer treatment factor was a significant source of variation ($p<0.001$), indicating that different plasticizers significantly affected the resulting coating gloss on the chocolate surface. The formulation replications differed significantly from each other ($p<0.001$), indicating that the different batches of WPI formulations made in different days affected the gloss of the chocolate samples. This suggests that the difference in the environmental conditions such as temperature and relative humidity of the different days those formulation batches were made and/or applied significantly affected the gloss of the chocolate samples. The process replications which were made on the same day under similar room temperature and RH did not show a significant difference. These results from formulation replications and process replications indicate that environmental conditions such as the relative humidity and the room temperature were important in affecting the resulting gloss on the chocolate surface. Neither the storage replications nor the instrumental replications were a significant source of variation.

The plasticizer sucrose resulted in the highest gloss, followed by PG, then by PEG 400, and lastly by glycerol. β-lactoglobulin films made with these same plasticizers showed different oxygen permeability properties and different mechanical properties. Among the films investigated, sucrose-plasticized films had the lowest oxygen permeability and were characterized as the stiffest and strongest film in terms of mechanical properties. However, there is no literature on the effect of different plasticizers on the gloss of whey protein or any other films or coatings.

The difference in the initial average gloss values was not the only different phenomena resulting from different plasticizers. There was a significant difference in the gloss fade rate and the stabilized gloss values. Glycerol-plasticized and PEG 400-plasticized coatings had very low gloss values and that faded away within days. Glycerol- and PEG 400-plasticized coatings stabilized at lower gloss values than the PG- and sucrose-plasticized coatings. The gloss fade of the PG-plasticized coatings occurred over a month period, and the coatings developed visible cracks and flakes during this period. The gloss fade of the sucrose-plasticized coatings occurred over a longer period of time and the gloss stabilized at a higher value compared to the other plasticizers. The gloss fade may have resulted from plasticizer migration into the chocolate. Since sucrose is a non-linear bulky compound, this may have impeded sucrose migration into the chocolate. Also since chocolate contains sucrose, there existed a smaller gradient from the WPI/plasticizer coating to the chocolate. This may have also affected slower migration of sucrose into the chocolate compared to the other plasticizers.

Example 3

This Example sets forth the experimental procedures for measuring consumer acceptance of WPI coatings compared to shellac and other coatings.

Materials and Methods

Coating Solutions

Whey Protein Coatings

The whey protein coatings included WPI (Bipro®, Davisco Foods International, Lesuer, Minn., USA) as the film-coating agent and sucrose (Granulated pure cane sugar, C & H Inc., Crockett, Calif., USA) as a plasticizer. Cocoabutter (Blommer Chocolate, Union City, Calif., USA) was added to produce a WPI-plasticizer-lipid formulation. Cocoabutter was used as the lipid source, because cocoabutter is label-friendly when used on confectioneries. Cocoabutter also has a low melting point and gives small particle size when emulsified with WPI solution, resulting in higher gloss (Trezza, et al., *J. Food Sci.*, 65(4): 658–662 (2000)).

There were four WPI treatments: Two without lipid which varied in the native WPI amount, and two with lipid which varied in lipid amount. Table 1 shows the ratio of the constituents in each WPI coating treatment. The sample codes in Table 1 are used throughout the paper. Shellac treatment was used as the reference. The denatured solution was prepared by heating 10% WPI solution (w/w) for 30 minutes in a water bath at 90° C. (McHugh, et al., *J. American Oi Chemist Society*, 71(3): 307–312 (1994). The denatured solution was then cooled down to room temperature (~25° C.) in an ice bath for those solutions which did not contain lipid. For lipid-containing treatments, cocoabutter which had been melted was added to the heat-denatured WPI solution, and then emulsified for 5 minutes using a hand blender (Braun hand blender MR360, Braun Inc., Woburn, Mass., USA). The emulsion was cooled down to room temperature using an ice bath. The resulting emulsion had a bimodal particle-size distribution, and the mean particle size was approximately 1.7 μm measured by the Malvern Mastersizer (model MS 20, Malvern Instruments Ltd., Malvern, England) recorded as the D(3,2) diameter. The native WPI was added after the solution was cooled down to room temperature. Sucrose was added to all coating solutions in a 1 to 1 ratio of the total WPI to sucrose.

TABLE 1

The ratio (wt. basis) of the constituents in each WPI coating treatment.
The sample codes are capitalized and underlined.

|  | WPI without cocoabutter (Denatured: Native = 1:1) <u>DN11WO</u> | WPI without cocoabutter (Denatured: Native = 1:2) <u>DN12WO</u> | WPI with cocoabutter (DWPI: cocoabutter = 3:2) <u>W32</u> | WPI with cocoabutter (DWPI: cocoabutter = 1:1) <u>W11</u> |
|---|---|---|---|---|
| Denatured WPI (DWPI) | 1 | 1 | 1 | 1 |
| Native WPI (NWPI) | 1 | 2 | 1 | 1 |
| Sucrose | 2 | 3 | 2 | 2 |
| Cocoabutter | 0 | 0 | 2/3 | 1 |
| Water | 9 | 9 | 9 | 9 |

Shellac Coating

Shellac coating solution was made using 190 proof undenatured ethyl alcohol (ET108, USP, Spectrum Chemical Mfg. Corp., Gardena, Calif., USA) as the solvent. Refined shellac powder (Type R-49, Mantrose-Haeuser Co., Attleboro, Mass., USA) was dissolved in the ethanol to form 30% (w/w) solution. Typically, a 25–30% shellac solution is used commercially, with the variation in the strength of the solution depending on the confectionery product being glazed (Minifie, B. W., *Chocolate, Cocoa & Confectionery: Science & Technology*, 2nd Ed., AVI Publishing Company, Inc., Westport, Conn., pp. 105–127 (1980a). Propylene glycol (USP/FCC, Fisher Scientific, Fair lawn, NJ, USA) was added in a 1 to 9.3 ratio of propylene glycol to shellac. The mixture was stirred until shellac was completely dissolved.

Gum Coating

Prior to coating with shellac solution, the chocolate-covered almonds were precoated with gum solution to prevent migration of ethanol into the chocolate. Gum coating solution was prepared by dissolving corn syrup solids (Cantab, Penwest Foods, Richland, Wash., USA) into boiling water to make 20% solution. To this solution, tapioca dextrin (K-4484, National Starch and Chemical Co., Bridgewater, N.J., USA) and xantham gum (Keltrol T, Kelco, Division of Merck & Co. Inc., San Diego, Calif., USA) were added at a 1 part corn syrup solids to 3.7 part tapioca dextrin and 0.02 part xantham gum. The solution was thoroughly mixed until the solids were totally dissolved. The total solids of the resulting gum solution was 54% (w/w).

Chocolate-Covered Almonds

Unglazed milk-chocolate-covered almonds were purchased from Shade foods Inc. (10832801, Shade foods Inc., Union City, Calif.).

Coating Procedure and Batch Preparation

WPI Treatments

For all four WPI coating treatments, the coating was done using a pan coater (LP16, LMC International, Elmhurst, Ill., USA) with a diameter of 16 inches. The coating solution was ladled onto the unglazed milk-chocolate-covered almonds and evenly distributed by jogging (rotating) the pan. The jogging process was stopped after the solution was completely applied. The coated batch was then dried using cool air (10–20° C.).

The drying process consisted of drying one side of the batch in the pan, then rotating the pan 180° to flip the batch to the other side for drying. The drying time was 10–20 minutes on each side, with 4–6 flips. Hence, the total drying time was in the range of 1.5 to 2 hours. Three coatings were applied for each batch treatment. After each coating application, the coated batch was laid out in a single layer in a room with a temperature range of 15–20° C. for ~24 hours. Since the $a_w$ of the commercial chocolate-covered almonds was in the range of 0.35 to 0.4, we adjusted the $a_w$ of the WPI-coated chocolates in this study back to this same range. Thus, after the third coating was applied and the coating was completely dried for ~24 hours, the coated batch was conditioned in a constant relative humidity (RH) chamber (Fisher Scientific, Fairlawn, N.J., USA) at RH to decrease batch $a_w$ from ~0.5 to 0.35. RH of the chamber was achieved using a saturated salt solution of magnesium chloride (Certified A.C.S., Fisher Scientific Inc., Fair Lawn, N.J., USA) and moisture-absorbent sachets (silica gel pillow pack, Desiccare Inc., Santa Fe Springs, Calif., USA). Initially only the saturated magnesium chloride solution (RH≈33%) (Carr and Harris 1949; Rockland 1960) was used. However, a preliminary experiment indicated that the $a_w$ of WPI-coated batch did not equilibrate with the RH of the chamber after a 2 week period. Thus, the RH of the chamber was lowered to 20% RH using moisture absorbent sachets, and the $a_w$ of the WPI-coated chocolate batch then equilibrated to 0.35 within 3 to 4 days. After the $a_w$ of the WPI-coated batch reached ~0.35, the coated chocolates were stored in half gallon mason jars in a refrigerator (5–10° C.) until they were taken out to be tested by consumers.

Gum Solution and Shellac Treatment

The coating procedure used for the gum coating solution was the same as that used for the WPI coating treatments. The drying time for the gum coating was also similar to that of the WPI coating treatments. Also, similarly, 3 gum coatings were applied onto the chocolate surface. Normally, 1 to 5 gum coatings are applied to ensure fall coverage of the chocolate surface in a commercial polishing step (Thomas 1987).

After the third gum coating was dried for ~24 hours, shellac glaze was applied onto the batch. The coating procedure for the shellac-coated batch was also the same as that used for the WPI coating. The total drying time for the shellac-coated batch was only about 20 minutes with 5 flips, since it took much less time to evaporate ethanol solvent. The shellac-coated batch was then laid out in a single layer in a room with a temperature range of 20–24° C. Then the batch was also conditioned in the RH chamber to lower $a_w$ to ~0.35. After the $a_w$ reached 0.35, the shellac-coated chocolates were stored in half gallon mason jars in the refrigerator (5–10° C.) until they were taken out to be tested by consumers.

Instrumental Gloss Measurement Procedure

The gloss of chocolate samples was measured using a Tricor gloss meter (801A, Tricor Systems Inc., Elgin, Ill., USA). The Tricor gloss meter measures gloss of samples with curved surfaces. Before the gloss of a sample is measured, the instrument is calibrated using a calibration reference plate with gloss value of 274. The gloss of the reference plate when measured using MICRO-TRI-GLOSS meter (BYK Gardner, Silver Spring, Md., USA) was 91.9, 94.8 and 99.9 at 20°, 60° and 85° angles from the normal to the plate surface, respectively. For the gloss measurement of a sample, gloss data is extracted from a grey-scale image of the sample generated by the Tricor instrument. The grey-scale image consists of many pixels, and brighter pixels indicate more gloss at that location. In order to quantify gloss, pixels with similar brightness are grouped together and the average gloss of those pixels is calculated. A group can be specified by the experimenter and is usually represented as x % of the brightest pixels above a threshold value which is determined by the glossiness of the sample being measured. The threshold value should not be set too high to disregard the values from the glossy area of the sample, and it should not be set too low to take the values from the non glossy part of the sample. In this study, the average gloss of the 5% of the brightest pixels was recorded for each sample, and the threshold value was designated as 45. Each chocolate sample was measured three times, and this was regarded as the instrumental replication.

Example 4

This Example sets forth the consumer acceptance test procedure.

Consumers

One hundred and eighty consumers (80 male, 100 female) recruited at the Memorial Union of the University of California, Davis, participated in this study. The consumers were screened using a questionnaire. The screening questionnaire consisted of questions involving allergic responses to the samples and ingredients in the coating and frequency of the purchase and consumption of chocolate products. Only the consumers with no allergic responses who purchase and consume chocolate products at least once a month were selected.

Sample Preparation and Presentation

Samples were taken out from the refrigerator at least 2 hours prior to the start of the first consumer's evaluation, in order to equilibrate to room temperature. Samples were served at room temperature in 2 oz plastic cups (Rykoff-Sexton, Inc., Lisle, Ill., USA) labeled with 3-digit random codes generated by the random numbers table (O'Mahony, M., Chi-square. In: Fennema O R, Karel M, Sanderson G W, Tannenbaum S R, Walstra P, Whitaker J R, editors. *Sensory evaluation of food—Statistical methods and procedures*. Marcel Dekkar Inc., New York, N.Y., p 91–110 (1986a). The presentation order of the samples for each consumer was designed based on the complete set of mutually orthogonal latin squares (MOLS) design (Wakeling, I. N., Food Quality and Preference, 6: 299–308 (1995). The complete set of MOLS design is balanced for all carry-over effects up to and including order t–1, where t is the number of products (Wakeling, I. N., *Food Quality and Preference*, 6: 299–308 (1995). In this study, 9 complete sets of MOLS were used for the five samples with 180 consumers.

Experimental Protocol

The screened consumers were asked to fill out Product Attitude Survey I, which consisted of general questions such as, age, gender and occupation. They were also asked if they were on a special diet such as low salt, low fat, low calorie, diabetic, high calorie or no special diet, to assess any correlation of their liking of a specific coating treatment to their special diet.

Each sample cup contained 4 to 5 pieces of chocolate covered almonds. All five samples, representing the four WPI treatments and the shellac coating, were presented at once in a tray. Consumers were asked to rate the samples in a specified order written on a sticky note placed in the corner of the sample tray. Consumers were asked to rate the samples for overall degree of liking (DOL) and DOL of taste, DOL of texture, DOL of overall appearance, DOL of surface texture (appearance) and DOL of gloss, all on a nine-point hedonic scale (Peryam, et al., *Food Technology*, 11(9), Suppl. 9–14 (1957). The nine-point hedonic scale and corresponding anchoring terms were placed on the table. Consumers were asked to physically place the samples on the scale according to their rating. When the rating was completed for each attribute, the DOL scores were recorded by the experimenters and the samples were placed back into the tray in the order given on the sticky note to be evaluated for the next attribute. This procedure was followed for two reasons: first, to avoid any repetition of the scores without re-evaluating the samples due to the fact that consumers have access to their previous scores and, second, to avoid any mistakes made by untrained consumers when recording the data. Consumers were instructed to taste and swallow the samples for overall DOL, DOL of taste and DOL of texture attributes. Rinsing protocol consisted of one carbonated water (Select, Safeway, Davis, Calif., USA) followed by one drinking water (Black Mountain Spring Water, San Carlos, Calif., USA). Consumers were strongly advised to rinse in between each sample. Consumers were allowed to retaste the samples, if needed, and were allowed to change the rating of previous samples. For the appearance attributes, consumers were asked to observe the samples visually and rate.

After the rating session was over, consumers were asked to complete Product Attitude Survey II, which consisted of questions regarding their change in acceptance and in purchase intent had they known given information about shellac glaze. The total session length ranged from 15 to 25 minutes.

Statistical Analysis

Analysis of variance (ANOVA) and Fisher's least significant differences (LSD) ($p<0.05$) were executed with SAS software (SAS version 6.12, 1996) on the hedonic ratings for the chocolate (overall DOL, DOL of taste, texture, overall appearance, surface texture (appearance only) and gloss). Internal preference mapping (a principal component analysis (PCA) of the covariance matrix of consumers by products) was done on the consumer acceptance data using FIZZ software (Biosystemes; Couternon, France).

Example 5

Results and Discussion

Instrumental Gloss Values

The mean instrumental gloss values measured by the Tricor gloss meter (801 A, Tricor Systems Inc., Elgin, Ill., USA) for the five treatments are shown in Table 2, along with their standard deviations. The mean gloss values of the WPI treatments ranged from 186 to 239.67. WPI treatments with more cocoabutter exhibited less gloss and WPI treatments with more native WPI showed more gloss. The mean gloss value of the shellac-coated chocolates was within the range of the mean gloss values of the WPI treatments, indicating that the WPI treatments were successful in providing gloss to the chocolate surface comparable to the shellac treatment.

TABLE 2

The mean and the standard deviation of the instrumental gloss values for the five treatments measured by the Tricor gloss meter. The codes for the samples are in Table 1.

|  | DN11WO | DN12WO | W11 | W32 | Shellac |
|---|---|---|---|---|---|
| Average Gloss Value | 234.33 | 239.67 | 186.00 | 200.67 | 227.67 |
| Standard Deviation of the three replications | 8.08 | 7.09 | 3.46 | 8.50 | 6.03 |

Consumer Acceptance Test

ANOVA of the hedonic ratings for overall DOL (F=3.56, P<0.01), DOL of taste (F=4.96, p<0.001), texture (F=6.54, p<0.001), overall appearance (F=45.02, p<0.001), surface texture (appearance) (F=55.09, p<0.001) and gloss (F=25.67, p<0.001) differed significantly. Mean overall DOL, DOL of taste, texture, overall appearance, surface texture (appearance) and gloss ratings and the least significant differences (Fisher's LSD) of the 5 samples are shown in Table 3.

TABLE 3

Sample means for the degree of liking and LSDs for all attributes. Means with different letters are significantly different (p < 0.05). The codes for the samples are in Table 1.

|  | DN11WO | DN12WO | W11 | W32 | Shellac |
|---|---|---|---|---|---|
| Overall | 5.94ab | 5.68b | 6.14a | 6.22a | 5.96ab |
| Taste | 5.90bc | 5.69c | 6.31a | 6.18ab | 5.83c |
| Texture | 5.46c | 5.49c | 6.12a | 5.91ab | 5.59bc |
| Overall Appearance | 4.69c | 4.29d | 6.28a | 5.13b | 5.22b |
| Surface Texture (Appearance) | 4.68c | 4.31d | 6.39a | 4.97c | 5.61b |
| Gloss | 4.69c | 4.46c | 6.30a | 5.59b | 5.31b |

It was found from the instrumental results and the consumer acceptance results that the consumers had higher liking for the samples with less gloss and more smooth appearance. They not only liked these samples rated by appearance, but they also preferred these samples when rated by the taste and texture attributes. This trend was also shown for overall DOL. The mean hedonic ratings for all 6 attributes of the W11 treatment were above 6 (=slightly like) on a 9-point hedonic scale. For the W32 treatment, the mean hedonic ratings were in the range of 4.97 to 6.22. This treatment was liked the most for overall DOL, but for specific attributes, it ranked second or third. For shellac-coated treatment, the mean hedonic ratings were in the range of 5.22 to 5.96, where 5 equals to neither like nor dislike on the 9-point hedonic scale. For most of the attributes, the W11 and W32 treatments were liked the most, followed by the shellac-coated treatment, and lastly by the DN11WO and DN12WO treatments. The W11 treatment ranked first, followed by shellac treatment, for DOL of overall appearance and surface texture (appearance) attributes.

Product Attitude Survey II

Consumers completed the Product Attitude Survey II after they had completed the rating session. The first question in this survey was an open-ended question: "What things do you associate with shellac?" This question was followed by a brief description of shellac uses including edible shellac. There were five categorical questions which are listed in Table 4. FIGS. 1 to 5 are the plots for the number of consumers for each category of those questions. The data reveal that the majority of the consumers were not familiar with the term "shellac", and so the majority of them were neutral in their liking of those products containing shellac. And this resulted in "no change" in their purchase intent for those products containing shellac. However, the majority of the consumers expressed "strong dislike" or "dislike" of those products associated with beetle exudate, thus their purchase intent was decreased. These questions were analyzed by the chi-square test. Chi-square is used to test hypotheses about frequency of occurrence in two or more categories. In general, chi-square is given by the following formula (O'Mahony, M., Chi-square. In: Fennema O R, Karel M, Sanderson G W, Tannenbaum S R, Walstra P, Whitaker J R, editors. *Sensory evaluation of food— Statistical methods and procedures*. Marcel Dekkar Inc., New York, N.Y., p 91–110 (1986a):

$$chi\text{-}square = \sum \left[ \frac{(O-E)^2}{E} \right]$$

where, O=observed frequency and E=expected frequency if the null hypothesis were true. The calculated chi-squares were compared to the critical chi-square values given in a table according to their degrees of freedom (O'Mahony, M., Statistical tables, Table G.7. In: Fennema O R, Karel M, Sanderson G W, Tannenbaum S R, Walstra P, Whitaker J R, editors. *Sensory evaluation of food—Statistical methods and procedures*. Marcel Dekkar Inc., New York, N.Y., p 415 (1986b).

TABLE 4

Questions and categories presented in Product Attitude Survey II

| Questions | | Calculated chi-squares | Degrees of Freedom (df) | Significance level |
|---|---|---|---|---|
| Q1: | Did you know that some foods contain shellac? (2 categories) | 55.56 | 1 | p < 0.001 |
| Q2: | How would you feel about food that has shellac as an ingredient? (5 categories) | 182.39 | 4 | p < 0.001 |
| Q3: | How would knowing a food contained shellac affect your purchasing intent? (3 categories) | 74.63 | 2 | p < 0.001 |
| Q4: | How would you feel about beetle exudate associated with food? (5 categories) | 103.39 | 4 | p < 0.001 |

TABLE 4-continued

Questions and categories presented in Product Attitude Survey II

| Questions | Calculated chi-squares | Degrees of Freedom (df) | Significance level |
|---|---|---|---|
| Q5: How would knowing a food contained beetle exudate affect your purchasing intent? (3 categories) | 89.2 | 2 | $p < 0.001$ |

For each question presented in Table 4, chi-square was calculated. The calculated chi-square values, the degrees of freedom for each question, and the corresponding significance level are also shown in Table 4. For all the five categorical questions, there was a significant difference in the distribution of the number of consumers who chose one category over the others.

Example 6

Conclusion of the Studies Reported in Examples 3–5.

The results strongly suggested that there is a high potential for the WPI formulations studied to be used as a chocolate glaze alternative to shellac glaze.

Different constituents in the coating formulation, such as the amount of lipid added to the WPI formulation and the level of native vs. heat-denatured WPI added, can significantly affect the appearance, taste and texture of the coating. Heat-denatured WPI produces films that are stronger, stiffer and more extendible compared to films from native WPI (Pérez-Gago and Krochta, 1999). However, the influence on the appearance, taste and texture of the WPI-coated chocolate product and how these affect consumer acceptance can only be evaluated by sensory methods. The consumer acceptance test measures the acceptability or liking for a food. Thus, the test provides a means to estimate the acceptance of the product based on its sensory properties (Resurreccion, A.V.A, Sensory test methods. In: Bloom R., ed, *Consumer sensory testing for Product Development*, Aspen publication, Aspen publisher inc., p 9–42 (1998).

Example 7

This study, and the ones below, concern the effect of WPI coatings on nuts, and especially peanuts.

Raw Materials

The variety of peanuts used for the studies herein was "medium runner". The peanuts contained 48–52% lipid, 22–30% protein, 3–5% sugar and less than 2% moisture ($a_w \approx 0.25$).

The whey protein coatings included WPI (Bipro®, Davisco Foods International, Lesuer, Minn., USA), glycerol (USP/FCC, Fisher Scientific Inc., Fair Lawn, N.J., USA) as a plasticizer, lecithin (Centrolene® A, Central Soya Company, Fort Wayne, Ind., USA) as a surfactant and methyl paraben (NF/FCC, Fisher Scientific Inc., Fair Lawn, N.J., USA) as an antimicrobial agent. Vitamin E (Nature's Life, Gardengrove, Calif., USA) was added to some of the coating formulations to test its antioxidant properties.

Sample Treatments and Storage conditions

Both native and heat-denatured WPI were included in the study, because they produce films with different solubility, tensile strength and oxygen-barrier properties (Pérez-Gago et al., *J. Food Sci.*, 64(6):1034–1037 (1999); Pérez-Gago and Krochta, *J. Agric. Food Chem.*, 49(2):996–1002 (2001)). There were six sample treatments: 1) heat-denatured WPI without vitamin E, 2) heat-denatured WPI with vitamin E, 3) native WPI without vitamin E, 4) native WPI with vitamin E, 5) control (water+plasticizer+surfactant+antimicrobial agent), and 6) reference (untreated peanuts). All coating solutions contained 10% WPI (w/w). The denatured solution was prepared by heating the 10% WPI solution (w/w) for 30 minutes in a water bath at 90° C. (McHugh and Krochta, *J. Agric. Food Chem.*, 42:841–845 (1994)). The denatured solution was then cooled down to room temperature (~25° C.) in an ice bath. Glycerol was added to all coating solutions at a 1 to 1 ratio of WPI to glycerol. Lecithin and methyl paraben were added to all coating solutions at 0.05% and 0.1% of the coating solution (w/w), respectively. When vitamin E was added, it was at 0.5% of the coating solution (w/w). The same amount of ingredient(s) was added to water (Arrowhead Mountain Spring Water Company, Brea, Calif., USA) to make the control. WPI-vitamin E emulsions were made using a Microfluidizer homogenizer (HC 5000, Microfluidics International Corp., Newbury, Mass., USA). The hot liquid was passed through the homogenizer 6 times using a homogenizing pressure of 6000 psig. The resulting emulsion had a normal particle-size distribution and the mean particle size was approximately 0.6 μm. After all the ingredients were mixed, the solution was strained with 2 layers of cheese cloth and stored for 1 to 3 days at a refrigeration temperature (5–10° C.) until the coating process took place.

A commercial coater (Labcoater II system, O'Hara Manufacturing, LTD., Toronto, Canada) was used to coat the peanuts with WPI solutions and control treatment. This coater is a simultaneous spray-jog-dry type of coater which is mainly used to coat pharmaceuticals and nutritional supplements. For our peanut coating, we separated the spray phase and the dry phase of the process.

For the spray phase, the conditions were the air inlet temperature, 30° C.; air exhaust temperature, 15 to 22° C.; pan rotation rate, 12 to 18 revolution/min; air flow, 200 cfm. For the dry phase, the conditions were air inlet temperature, 65° C.; air exhaust temperature, 19 to 49° C.; pan rotation rate, 1 revolution/min; air flow, 750 cfm. The total amount of peanuts coated was 10 Kg. The amount of coating solution applied was aimed at a 5% weight gain of the peanuts after the coating was completely dried. The spray rate was set at 300 g/min per gun, and the actual spray rate was approximately 580 g/min for two guns. The spray phase took approximately 5 min. The duration of the spray phase was calculated according to the spray rate measured just before each spray phase. The drying phase lasted approximately 30 min, and then the peanuts were cooled down to room temperature (~25° C.) before they were taken out of the pan. Close visual observation of the coated peanuts revealed smooth, glossy coatings without cracks or holes.

After the coating solution was applied onto the samples and dried, the peanut samples were laid out at room temperature for about 24 hours prior to packaging them into oxygen-barrier bags. They were then held at −24° C. until they were taken out of the freezer to be stored at various storage conditions for headspace GC analysis.

Peanut samples weighing 180 g were placed into wide-mouth 2-quart mason jars (Ball®, Alltrista Corp., Muncie, Ind., USA) to be stored at ambient conditions (T≈25° C., RH≈35%). The $a_w$ values of the coated and the control peanuts were adjusted to the range 0.29–0.38 using moisture absorbent sachets (silica gel pillow pack, Desiccare Inc., Santa Fe Springs, Calif., USA). The number of moisture absorbent sachets added into the mason jars was calculated based on the initial $a_w$ of the coated and the control peanuts and the capacity of the moisture absorbent sachets to absorb a certain amount of water. The $a_w$ of the peanuts were used to calculate the amount of moisture need to be absorbed in order to achieve the $a_w$ of the reference sample. The $a_w$ of the reference was in the range 0.25–0.3. The samples were stored for up to 68 weeks.

Headspace Gas Chromatography Analysis

Lipid oxidation was evaluated by measuring the hexanal content of the peanut samples by static headspace gas chromatography (GC) (Perkin-Elmer autosystem with HS-40 autosampler, Norwalk, Conn.). The GC analysis used a capillary DB-1701 column (30 m (1)×0.32 mm (I.D.), 1 mm thickness, J & W, Folsom, Calif.); HS sampler temperature, 60° C.; oven temperature, 65° C.; injector temperature, 180° C.; detector temperature, 200° C. 5 g of peanut samples were ground for 8 seconds using a grinder (Braun coffee bean grinder KSM2(4), Braun Inc., Woburn, Mass., USA). Duplicate 0.5 g of ground peanut samples were placed into 22 mL headspace sample vials, which were immediately sealed with silicone rubber teflon caps. The vials were then inserted into the headspace sampler at 60° C. for 15 minutes and pressurized with carrier gas (He) for 30 seconds. An aliquot of gas phase was injected directly into the GC through the stationary injection needle. The hexanal content of the samples was measured at storage times of 0, 33, 46, 53, 56, 60, 64, 68 weeks.

Example 8

Results and Discussion

Results from the analysis of variance (ANOVA) (SAS 6.12, SAS institute Inc., 1996) of the extent of oxidation determined by hexanal level I are shown in Table 5.

TABLE 5

Analysis of variance on the hexanal level measured by static headspace gas chromatography for peanut samples. F-ratios are shown for the sources of variations.

| Source | Degrees of freedom | F-ratio |
|---|---|---|
| Sample treatment | 5 | 3108.50*** |
| Storage time | 7 | 1485.31*** |
| Experimental replication | 1 | 1.14 NS |
| Instrumental replication | 1 | 0.42 NS |

***indicates significance at p < 0.001. NS indicates no significant difference.

The coating treatments and storage days and storage temperatures were significant sources of variations (p<0.001). These results were expected since the coating treatments and storage days should have significantly influenced the extent of oxidation of the peanut samples. The experimental replications were two separate jars with the same coating treatment. The instrumental replications were two separate GC vials of the same ground peanut sample. The experimental replications and the instrumental replications were not significant sources of variation.

The six coating treatments differed significantly in hexanal level. Means and least significant differences (LSDs) for the treatments are presented in Table 6. The LSD results show the characteristics of the different treatments averaged across storage time, experimental replication and instrumental replication. From these results, it can be seen that the untreated peanuts had the highest hexanal level which was significantly different from all the other treatments. Of the coated treatments, native WPI with Vit. E treatment showed the highest extent of oxidation followed by heat-denatured WPI with Vit. E and native WPI without Vit. E. The control treatment showed no significant difference when compared to heat-denatured WPI with Vit. E and native WPI without Vit. E treatments. Heat-denatured WPI without Vit. E treatment had the least oxidation occurring exhibited by the hexanal level being the smallest.

TABLE 6

Effect of peanut coating formulations on the extent of lipid oxidation determined by the area under the peak of hexanal. Means with different superscripts are significantly different when analyzed by Fisher's Least Significant Difference (p < 0.05).

| Peanut coating formulation | Means |
|---|---|
| Untreated | 925.68[a] |
| Native WPI with Vit. E[1] | 276.31[b] |
| Heat-denatured WPI with Vit. E[1] | 213.45[c] |
| Native WPI without Vit. E[1] | 208.24[c] |
| Control[2] | 203.41[c] |
| Heat-denatured WPI without Vit. E[1] | 139.45[d] |

[1]Vit. E stands for vitamin E.
[2]Control: glycerol + lecithin + methyl paraben + water The nature of the lipid substrates and the nature of the system where Vit. E is added have a significant impact on Vit. E's potential to be an antioxidant or a prooxidant. The literature reports Vit. E levels where it can be an antioxidant or a prooxidant for oils and model emulsion solution systems (Frankel et al., *J. Agric. Food Chem.*, 7:438–441 (1959); Huang et al., *J. Agric. Food Chem.*, 42:2108–2114 (1994); Huang et al., *J. Agric. Food Chem.*, 43:2345–2350 (1995)). However, there are no reported levels of Vit. E in coating systems where it may act as an antioxidant or a prooxidant. And the results in this study indicated that the Vit. E level used in this study was actually in the prooxidant range.

Plotting of the hexanal level versus storage time showed that the untreated peanut samples went through the initiation and the propagation periods of lipid oxidation, whereas the WPI-treated peanuts and the control peanuts were still at the initiation period.

Example 9

The results from this study indicated that the heat-denatured WPI without Vit. E treatment had the least oxidation when stored in ambient conditions. The control treatment without the film-forming WPI also showed significantly less oxidation when compared to the untreated. This may be due to the fact that the control solution when poured onto the peanuts caused the peanut surface pores to collapse resulting in a denser surface which is less caused the peanut surface pores to collapse resulting in a denser surface which is less permeable to oxygen.

It is understood that the examples and embodiments described herein are for illustrative purposes only and that various modifications or changes in light thereof will be suggested to persons skilled in the art and are to be included within the spirit and purview of this application and scope of the appended claims. All references cited herein, including journal articles, books, and abstracts, published or corresponding U.S. or foreign patent applications, issued U.S. or foreign patents, and any other references, are incorporated by reference herein, including all data, tables, figures, and text presented in the cited references.

What is claimed is:

1. A gloss coating for a food that does not have a peel or a skin, said coating comprising non-denatured whey protein isolate (WPI) or non-denatured soy protein isolate (SPI), and a disaccharide or monosaccharide plasticizer.

2. A gloss coating of claim 1, wherein said coating comprises non-denatured WPI.

3. A gloss coating of claim 1, wherein said plasticizer is a disaccharide.

4. A gloss coating of claim 3, wherein said plasticizer is selected from the group consisting of: sucrose, maltose, trehalose, cellobiose, and lactose.

5. A gloss coating of claim 4, wherein said plasticizer is sucrose.

6. A gloss coating of claim 1, wherein the food is a confection.

7. A gloss coating of claim 6, wherein the confection is a chocolate.

8. A gloss coating of claim 6, wherein the chocolate is selected from the group consisting of: milk chocolate, semi-sweet chocolate, bitter-sweet chocolate, sweet chocolate, dark chocolate, and imitation chocolate.

9. A gloss coating of claim 6, wherein the confection is selected from the group consisting of a hard panned confection, a soft panned confection, a starch molded confection and a compressed sugar tablet.

10. A gloss coating of claim 6, wherein the confection has an exterior surface comprising a dried yogurt formulation.

11. A gloss coating of claim 1, wherein the coating comprises both denatured and non-denatured WPI or SPI.

12. A gloss coating of claim 1, wherein the coating comprises both WPI and SPI.

13. A gloss coating of claim 1, wherein the coating further comprises a lipid.

14. A gloss coating of claim 13, wherein the lipid is cocoabutter.

15. A gloss coating of claim 1, wherein the coating comprises (a) denatured WPI and non-denatured SPI, or (b) non-denatured WPI and denatured SPI or (c) a combination of (a) and (b).

16. A method of providing an edible gloss coating to a food that does not have a peel or a skin, said method comprising coating said food with (a) a film-forming protein selected from the group consisting of whey protein isolate non-denatured (WPI) and non-denatured soy protein isolate (SPI) and, (b) a disaccharide or monosaccharide plasticizer.

17. A method of claim 16, wherein said film-forming protein is non-denatured WPI.

18. A method of claim 16, wherein said disaccharide or monosaccharide plasticizer is a disaccharide.

19. A method of claim 18, wherein said disaccharide is selected from the group consisting of: sucrose, maltose, trehalose cellobiose, and lactose.

20. A method of claim 19, wherein said plasticizer is sucrose.

21. A method of claim 16, wherein the food is a confection.

22. A method of claim 21, wherein the confection is a chocolate.

23. A method of claim 21, wherein the chocolate is selected from the group consisting of; milk chocolate, semi-sweet chocolate, bitter-sweet chocolate, sweet chocolate, dark chocolate, and imitation chocolate.

24. A method of claim 21, wherein the confection is selected from the group consisting of a hard panned confection, a soft panned confection, a starch molded confection and a compressed sugar tablet.

25. A method of claim 21, wherein the confection has an exterior surface comprising a dried yogurt formulation.

26. A method of claim 16, wherein the coating comprises a combination of denatured and non-denatured WPI or SPI.

27. A method for increasing shelf life of a nut, said method comprising (a) contacting said nut with an aqueous solution comprising a film-forming agent selected from the group consisting of whey protein isolate (WPI) and soy protein isolate (SPI), (b) mildly abrading said nut, and (b) drying said nut to its original water content, thereby increasing its shelf life.

28. A method of claim 27, further wherein said solution comprises a surfactant.

29. A method of claim 28, wherein said surfactant is selected from the group consisting of lecithin, an ethoxylate, and a sorbitan ester.

30. A method of claim 27, further wherein said solution comprises a plasticizer.

31. A method of claim 30, wherein said plasticizer is glycerol.

32. A method of claim 27, wherein said solution comprises WPI.

33. A method of claim 27, wherein said mild abrasion is caused by contacting said nut with a surface.

34. A method of claim 33, wherein said surface is a second nut.

35. A method of claim 34, wherein said nut is moved against said second nut by placing said nut and said second nut in a movable container and moving, vibrating, rotating, or shaking said container, thereby moving said nut against said second nut.

36. A method of claim 34, wherein said nut is moved against said second nut by placing said nut and said second nut on a surface and agitating the nuts.

37. A method of claim 34, wherein said nut and said second nut are of different types.

38. A method of claim 27, wherein said nut is a peanut.

39. A method of claim 27, wherein said nut is selected from the group consisting of almond, cashew, walnut, hazelnut, pecan, macadamia, pistachio, Brazil nut, and filbert.

40. A method of claim 27, wherein said WPI or SPI is undenatured WPI or SPI.

41. A method of claim 27, wherein said WPI or SPI is denatured.

42. A method of claim 27, wherein said film-forming agent comprises both native and denatured WPI, or SPI.

43. A method of claim 27, wherein the contacting of step (a) and the mild abrasion of step (b) occur concurrently.

* * * * *